(12) United States Patent
Shaw et al.

(10) Patent No.: US 9,487,620 B2
(45) Date of Patent: Nov. 8, 2016

(54) ON-LINE CONTROL OF MOLECULAR WEIGHT IN CONTINUOUS SOLID STATE POLYMERIZATION PROCESSES

(71) Applicant: INVISTA North America S.à r.l., Wilmington (DE)

(72) Inventors: Gordon Shaw, Charlotte, NC (US); Miguel Angel Osornio, Spartanburg, SC (US)

(73) Assignee: Invista North America S.a.r.l., Wilmington, DE (US)

( * ) Notice: Subject to any disclaimer, the term of this patent is extended or adjusted under 35 U.S.C. 154(b) by 0 days.

(21) Appl. No.: 14/382,530

(22) PCT Filed: Feb. 28, 2013

(86) PCT No.: PCT/US2013/028357
§ 371 (c)(1),
(2) Date: Sep. 2, 2014

(87) PCT Pub. No.: WO2013/130833
PCT Pub. Date: Sep. 6, 2013

(65) Prior Publication Data
US 2015/0112040 A1    Apr. 23, 2015

Related U.S. Application Data

(60) Provisional application No. 61/606,047, filed on Mar. 2, 2012.

(51) Int. Cl.
| | | |
|---|---|---|
| *C08G 63/02* | (2006.01) | |
| *C08G 63/80* | (2006.01) | |
| *C08G 69/06* | (2006.01) | |
| *C08G 69/30* | (2006.01) | |

(52) U.S. Cl.
CPC ............ *C08G 63/80* (2013.01); *C08G 69/06* (2013.01); *C08G 69/30* (2013.01)

(58) Field of Classification Search
CPC ............................. C08G 63/80; C08G 69/06
USPC ....................................... 528/271, 272, 308
See application file for complete search history.

(56) References Cited

U.S. PATENT DOCUMENTS

| | | | |
|---|---|---|---|
| 4,361,538 A | | 11/1982 | Dicoi et al. |
| 4,661,579 A | * | 4/1987 | Blocker ................ C08G 63/20 |
| | | | 524/602 |
| 6,153,149 A | * | 11/2000 | Rabitz et al. ................ 422/108 |
| 2002/0026030 A1 | | 2/2002 | Duh |
| 2005/0239997 A1 | * | 10/2005 | Matsumoto ................... 528/272 |
| 2009/0258226 A1 | | 10/2009 | Schwinn et al. |

FOREIGN PATENT DOCUMENTS

CN    2668248 Y    1/2005

OTHER PUBLICATIONS

Database WPI Week 199731, Thomson Scientific, London, GB; AN 1997-337114, XP002695411 & JP 9136965 A (Nippon Ester Co. Ltd.) May 27, 1997, 5 Pages.
International Search Report and Written Opinion received for PCT Patent Application No. PCT/US2013/028357, mailed on May 17, 2013, 9 pages.
International Preliminary Report on Patentability received for PCT Patent Application No. PCT/US2013/028357, mailed on Sep. 12, 2014, 7 pages.
Manenti et al., "Integrated Multilevel Optimization in Large-Scale Poly(Ethylene Terephthalate) Plants", Industrial Engineering Chemistry Research, vol. 47(1), XP002695412, Copyright © 2008 American Chemical Society, Nov. 30, 2007, pp. 92-104.
Rovaglio et al., "Dynamic Modeling of a Poly(ethylene terephthalate) Solid-State Polymerization Reactor II: Model Predictive Control", Industrial and Engineering Chemistry Research, vol. 43(15), XP002695416, Copyright © 2004 American Chemical Society, Jun. 22, 2004, pp. 4267-4277.

* cited by examiner

*Primary Examiner* — Terressa Boykin
(74) *Attorney, Agent, or Firm* — Gregory N. Clements; Clements Bernard, PLLC

(57) ABSTRACT

Methods of on-line control of molecular weight in continuous solid state polymerization processes. The solid state polymerization process can be a polyester process or to a polyamide process, and more specifically a poly(ethylene terephthalate) (PET) or a poly(butylene terephthalate) (PBT) or a nylon 6,6 continuous solid-state polymerization (SSP) process. An in-line viscometer melts and measures the molecular weight of the SSP resin and adjusts one or more of the process variables, i.e. reactor time, inert gas purity and inert gas temperature to maintain a constant resin molecular weight.

43 Claims, 3 Drawing Sheets

ON-LINE CONTROL OF MOLECULAR WEIGHT IN CONTINUOUS SOLID STATE POLYMERIZATION PROCESSES

RELATED APPLICATION

This application claims the benefit U.S. Provisional Application No. 61/606,047 filed on Mar. 2, 2012 which is incorporated herein in its entirety.

FIELD OF INVENTION

The present invention relates to the on-line control of the molecular weight in continuous solid state polymerization processes. In particular it is directed to a polyester process or to a polyamide process, and more specifically to a poly(ethylene terephthalate) (PET) or a poly(butylene terephthalate) (PBT) or a nylon 6,6 continuous solid-state polymerization process.

BACKGROUND OF THE TECHNOLOGY

To obtain high molecular weight polycondensation polymers, such as polyesters and polyamides, the polymerization process is conducted in two stages. In the first stage, a melt phase polymerization process is used to achieve an intermediate molecular weight, followed by the second stage which is a solid state polymerization (SSP) process which produces the final high molecular weight polymer. A melt process can be used to achieve the high molecular weight, but as the melt viscosity of the melt increases rapidly towards the end of the melt process, undesired side reactions can occur which limit the quality of the polymer. The production of a high molecular weight polymer in the SSP process can substantially avoid these side reactions and thus is the preferred process for high molecular weight products for critical applications such as bottle resins, industrial yarns and the like.

After the completion of the first process stage the melt polymerized polymer is extruded into strands, which are then cut into a pellet like form and are quenched, dried and transferred to a continuous solid state polymerization process. This comprises one of more crystallizers followed by a solid state reactor. The crystallizers heat and crystallize the polymer to a sufficiently high level of crystallinity such that it does not significantly crystallize further in the solid state reactor. Crystallization is an exothermic process that could lead to local hot spots in the solid state reactor if a polymer with too low a degree of crystallinity were fed to the reactor The solid state reactor comprises a long vertical, or horizontal or nearly horizontal, vessel, which may contain an agitator, and/or which may rotate, in which the hot crystallized polymer pellets enter from the top of the vertical reactor or the inlet side of the horizontal reactor. Within the reactor body the pellets meet a counter flow of a hot inert gas, such as nitrogen. Inert gas means a gas that does not chemically react with the polymer during the SSP process, nor react with the by-products from the SSP process to form compounds that will chemically react with the polymer or affect the cleaning process of the inert gas. The temperature of the gas in the solid state reactor is typically 10 to 50° C. below the melting point of the polymer. This gas stream removes the polycondensation by-products such that the polymerization process is driven to higher molecular weights. After exiting the solid state reactor the polymer pellets are cooled, either by a cold gas or in a water slurry/spray system or other suitable heat transfer systems, dried, and finally transported to a storage silo. Preferably the inert gas discharge is passed to a scrubber or absorber unit where reaction by-products are removed.

The rate of the polymerization process in SSP is controlled by the ratio of polymer to gas flow, the gas temperature and the temperature of the polymer in the reactor and the desired molecular weight is achieved after the specified reaction time considering all these process variables. Control of this process is normally achieved by taking samples of the solid state pellets and measuring their solution or melt viscosity in a laboratory, which typically takes between 4 to 10 hours. If changes to the process variables are required to bring the molecular weight back to target, this involves either changing the ratio of polymer to gas flow, changing the temperature of the inert gas, changing the composition of the gas, changing the inventory of pellets in the reactor, or a combination of any of these parameters.

SUMMARY OF THE INVENTION

The residence time in the solid state reactor is typically in the order of 16-30 hours when the Intrinsic Viscosity (IV) of the melt polymerized pellets is in the normal range of 0.40 to 0.60 dl/g, including in the range from 16-20 hours, after adjusting other process conditions, to avoid unduly large reactor vessels. In certain special cases, when the IV of the melt polymerized pellets is high (up to 0.7 dl/g) the residence time of the pellets ion the solid state reactor can be as low as 4-6 hours, depending on the final product needs. In the typical case this means that it takes a long time to change the molecular weight of the polymer back to target if it drifts from the target. There is therefore a need for a continuous measurement of the reactor molecular weight coupled with a control algorithm to maintain the molecular weight of the polymer on target in order to minimize the variation of the molecular weight of the solid stated polymer product.

Surprisingly, it has been found that coupling a melt viscometer directly to an SSP reactor with the appropriate algorithms to control the SSP reactor residence time, inert gas purity, and/or inert gas temperature significantly reduces molecular weight variability during SSP. Here, a melt viscometer is placed at the exit of a SSP reactor to measure the melt viscosity of a dry polymer chip. The measured value is then used to control the SSP reactor residence time, inert gas purity and/or inert gas temperature. These two steps are repeated to substantially maintain a constant SSP pellet molecular weight.

In one aspect, a method of controlling the molecular weight of a solid phase polymerized polycondensation polymer is disclosed. The method comprises generating a melt viscosity output value by measuring the melt viscosity of SSP polymer chips from the exit of a SSP reactor, controlling the SSP reactor residence time with the melt viscosity output value, and repeating the measurement and control steps to substantially maintain a constant SSP pellet molecular weight. The polycondensation polymer can be polyethylene terephthalate) (PET), a poly(butylene terephthalate) (PBT) or a polyamide such as nylon 6,6. The melt viscosity can be measured using a melt viscometer, which measures the viscosity of a dry, melted polymer chip.

In another aspect, a method of controlling the molecular weight of a solid phase polymerized polycondensation polymer is disclosed. The method comprises generating a melt viscosity output value by measuring the melt viscosity of SSP polymer chips from the exit of a SSP reactor, controlling the SSP reactor inert gas purity with the melt viscosity output value, and repeating the measurement and control steps to substantially maintain a constant SSP pellet molecular weight. The polycondensation polymer can be poly(ethylene terephthalate) (PET), a poly(butylene terephthalate) (PBT) or a polyamide such as nylon 6,6. The melt viscosity can be measured using a melt viscometer, which measures the viscosity of a dry, melted polymer chip.

In a further aspect, a method of controlling the molecular weight of a solid phase polymerized polycondensation polymer is disclosed. The method comprises generating a melt viscosity output value by measuring the melt viscosity of SSP polymer chips from the exit of a SSP reactor, controlling the SSP reactor inert gas temperature with the melt viscosity output value, and repeating the measurement and control steps to substantially maintain a constant SSP pellet molecular weight. The polycondensation polymer can be poly(ethylene terephthalate) (PET), a poly(butylene terephthalate) (PBT) or a polyamide such as nylon 6,6. The melt viscosity can be measured using a melt viscometer, which measures the viscosity of a dry, melted polymer chip.

In yet another aspect, a method of controlling the molecular weight of a solid phase polymerized polycondensation polymer is disclosed. The method comprises generating a melt viscosity output value by measuring the melt viscosity of SSP polymer chips from the exit of a SSP reactor, controlling at least two SSP reactor values selected from the group consisting of: (a) reactor residence time; (b) inert gas temperature; and (c) inert gas purity with the melt viscosity output value, and repeating the measurement and control steps to substantially maintain a constant SSP pellet molecular weight. The polycondensation polymer can be poly(ethylene terephthalate) (PET), a poly(butylene terephthalate) (PBT) or a polyamide such as nylon 6,6. The melt viscosity can be measured using a melt viscometer, which measures the viscosity of a dry, melted polymer chip.

DETAILED DESCRIPTION OF THE INVENTION

SSP Molecular Weight Control

Figure 1:
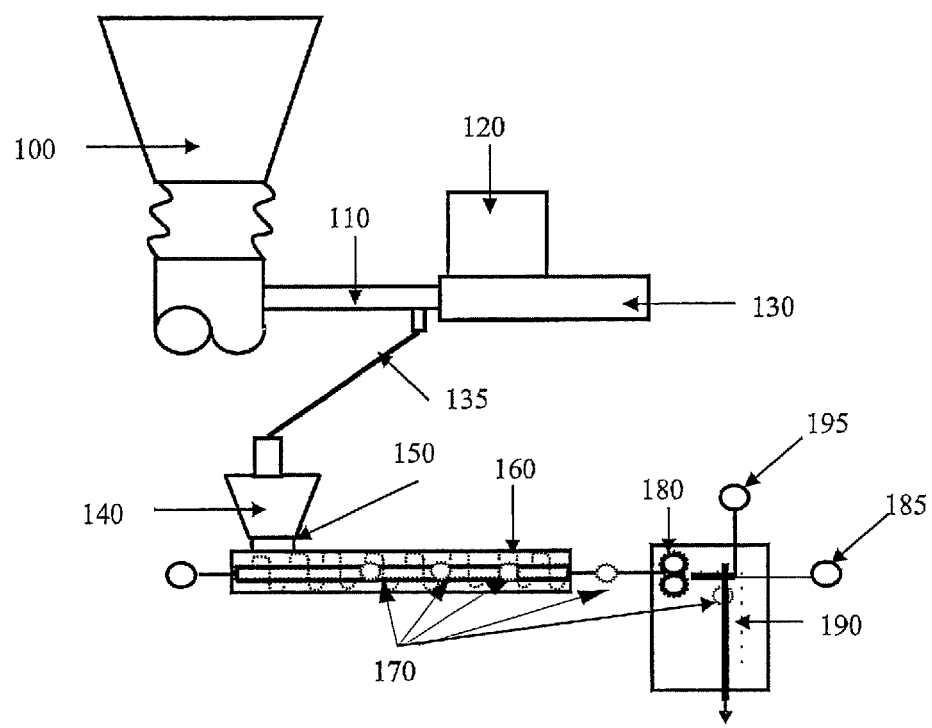
FIG. 1 shows a schematic of the viscometer installation.

The SSP pellets molecular weight is measured by repeatedly taking polymer pellet samples, under an inert gas atmosphere, from the exit section of the SSP reactor and rapidly measuring the pellet melt viscosity. The pellets samples are melted by an extruder, and then the molten polymer is pumped into a melt viscometer. The viscometer comprises a speed controlled gear pump, a capillary, whose size (length or/and diameter) can be varied according to the melt viscosity of the polymer anticipated, together with various temperature control and pressure measurement systems.

Using the measured pressure drop of the molten polymer flowing through the capillary, the melt-viscosity is calculated and converted to IV, in the case of PET, using an empirical correlation. Then depending upon the IV value obtained, the reactor residence time, inert gas temperature and/or inert gas purity is adjusted via software or proportional-integral-derivative controllers (PID) to achieve the desired IV within minimum possible variability. The residence time, inert gas temperature and inert gas purity adjustments are performed by a general purpose computer or other device that electronically carries out logical operations.

The disclosed methods reduce the molecular weight variability by approximately 40% as the viscosity is measured more accurately and process adjustments are made directly with minimal time delay with the on-line viscometer. Previous manual control operation had to wait for the laboratory analysis of the solution viscosity to correlate with molecular weight, which takes between 4-10 hours.

The disclosed methods also permit a reduction in the daily routine laboratory analyses per SSP line and consequently allow a reduction in the amount of waste chemical solvents produced. The SSP on-line viscosity control has also demonstrated a reduction in off-grade material during process start ups and product transitions when the IV level desired in the product is changed, either up or down. A single SSP viscometer can be attached to a single SSP line, or can be attached to more than one line to continuously monitor multiple processes. In this case the sampling system is designed in such a manner that pellets from all lines are taken sequentially as demanded by the measured process variability of any line. Independent measurements of the melt viscosity of the different samples is possible in a short time as the residence time in the extruder and gear pump-viscometer combination is short, allowing for rapid measurement on different samples, including the required flushing time between samples.

Melt Polymerization

Polyethylene terephthalate (PET) is conventionally made by reacting either dimethyl terephthalate or terephthalic acid with ethylene glycol, for example, via an esterification reaction, followed by a polycondensation reaction. When making PET, either in a batch or continuous process, the reactions can be driven to near completion, yielding PET having naturally up to 3 weight percent of diethylene glycol and other byproducts. It is also possible that the product application requires the presence of a co-polymeric species. This can be either a co-polymeric glycol or another acid species. The weight percentage of these species can vary between from about 0.5% to about 20% depending on the product needed, in addition to the amount of diethylene glycol in the product mentioned above.

Conventional continuous production of PET comprises reacting terephthalic acid and ethylene glycol (esterification reaction) at a temperature of approximately 200° to 250° C. forming a low molecular short chain length 'monomer' ("oligomer") and water. Because the reaction is reversible, the water is continuously removed, driving the reaction to the production of monomers and oligomers. Next the monomers and oligomers undergo polycondensation reaction in vacuum conditions, or in an inert gas condition, at a temperature of about 250° to 290° C. to form a polyester molecule normally having an IV of about 0.4 to 0.6 dl/g, measured by ASTM D4603. During the initial esterification reaction, no catalyst is needed. However, in the polycondensation reaction, a catalyst such as an antimony, germanium, titanium or aluminum compound, optionally with a co-catalyst is normally necessary to increase the rate of reaction to an acceptable level. The melt polymerized polyester is extruder through a die into strands which are quenched in water, cut into pellets and dried before being stored. Alternatively, the melt polymerized polyester can be extruded through a die and cut under water to form spheroidal pellets which are crystallized and dried before being stored.

PET is also made in batch and continuous processes from the reaction of the ester-dimethyl terephthalate and ethylene glycol, at a reaction temperature of approximately 190° to 230° C. forming alcohol (methanol) and monomer (principally bis-hydroxyethylene-terephthalate). This transesterification reaction is reversible and the alcohol must be continuously removed, driving the reaction to the production of monomer and some oligomer. In the reaction of dimethyl terephthalate and ethylene glycol, catalysts such as manganese, zinc, cobalt or other conventional metal ion catalysts are employed. Next, the monomer and oligomer undergo a polycondensation reaction at the conditions stated above to form polyester or copolyester normally having an IV of about 0.4 to 0.6 dl/g. Making a copolyester of PET and a dicarboxylic acid (to reduce the crystallization rate and improve its barrier properties) merely requires the addition of the acid or its ester equivalent, for example, to also undergo an esterification (or transesterification) reaction. Making a copolyester of PET and a diol merely requires the addition of the diol during esterification (or transesterification).

Resins containing up to 20 wt % of the dicarboxylic acid are useful in forming bottles or jar containers. Suitable diacids can be aliphatic, alicyclic, or aromatic dicarboxylic acids such as isophthalic acid; 1,4-cyclohexanedicarboxylic acid; 1,3-cyclohexanedicarboxylic acid, succinic acid, glutaric acid, adipic acid, sebacic acid, 1,12-dodecanedioic acid; 2,6-naphthalenedicarboxylic acid, bibenzoic acid, oxalic acid, malonic acid, pimelic acid, suberic acid, azelaic acid, maleic acid, fumaric acid, phthalic acid, hemimellitic acid, trimellitic acid, trimesic acid, or mixtures of these and their equivalents. It is often suitable to use a functional acid derivative equivalent such as dimethyl, diethyl, or dipropyl ester of the dicarboxylic acid. Bottle resin, including the present invention, typically contains 1.3 to 3.0 wt. %, based on the weight of the resin, of isophthalic acid as the crystallization retarder additive.

Alternatively, polyester resins can optionally be modified by up to 20 wt % of one or more different diols than ethylene glycol. Such additional diols include cycloaliphatic diols for example having 6 to 20 carbon atoms or aliphatic diols having 3 to 20 carbon atoms. Examples of such diols to be included with ethylene glycol are: diethylene glycol, triethylene glycol, 1,2-cyclohexanedimethanol, 1,3-cyclohexanedimethanol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4 hydroxypropoxyphenyl)-propane.

Modified polyesters can be made by reacting at least 85 mol-% terephthalate from either terephthalic acid or dimethyl-terephthalate with any of the above comonomers. These copolyesters based on having at least 85 weight %, based on polymer, of terephthalate units are referred to as 'PET copolyesters'.

In addition to polyester made from terephthalic acid (or dimethyl terephthalate) and ethylene glycol, or a modified polyester as stated above, polyesters can also include the use of 100% of an aromatic diacid such as 2,6-naphthalene dicarboxylic acid or bibenzoic acid, or their diesters, and a modified polyester made by reacting at least 85 weight % of the dicarboxylate from these aromatic diacids/diesters with any of the above comonomers.

The polyester can be selected from polyethylene terephthalate, polyethylene naphthalate, polyethylene terephthalate-co-isophthalate, polyethylene naphthalate-co-isophthalate, polyethylene-co-cyclohexane dimethylene terephthalate and mixtures thereof. The polyester can be a copolymer of polyethylene terephthalate having a comonomer content of less than 10 mole % of the polyester.

Although not required, additives may be used in the polyester. Conventional known additives include, but are not limited to an additive of a dye, pigment, filler, branching agent, reheat agent, anti-blocking agent, antioxidant, antistatic agent, biocide, blowing agent, coupling agent, flame retardant, heat stabilizer, impact modifier, UV and visible light stabilizer, crystallization aid, lubricant, plasticizer, processing aid, acetaldehyde scavenger and other organic by product scavengers, and slip agent, or a mixture thereof.

Solid State Polymerization

The solid state polymerization process for PET comprises crystallizing the polyester pellets at a temperature in the range of about 160° to 220° C. under forced motion in an inert gas atmosphere for a residence time of from 0.1 to less than 1.5 hours, dependent upon the types of crystallizers and upon the conditions of crystallization used. The crystallized pellet is continuously introduced under air-tight seal to a continuous reactor and polycondensed in contact with a counter flow of an inert gas, (typically nitrogen), at a temperature in the range of about 200° to 235° C. to achieve a reaction temperature within the range of about 195° to 230° C. The solid stated pellets are cooled at the exit of the solid state reactor with a mechanical, gas or water cooling unit. The inert gas discharge is passed to a scrubber or absorber unit where reaction by-products are removed. The gas is normally then recycled, but can be discharged in certain processes.

In the SSP process for PET and PET copolyesters, the crystallization temperature is set to (i) achieve greater than a specified (minimum) level of crystallization and (ii) achieve a reaction temperature of the pellets in the inlet stream to the SSP reactor. The reaction temperature is in the range of 10° to 50° C. below the PET or PET copolyester melting point.

In the processing of polyesters, the IV after the melt polymerization stage is in the range of 0.40 to 0.60 dl/g. During the SSP process the IV is increased to a range of 0.72 to 0.85 dl/g for polymer resins used for injection stretch blow molded bottles for the beverage industry. For polyester industrial filament yarns, the PET IV is raised to between 0.95 to 1.0 dl/g or above.

With reference to FIG. 1, a retractile sampler 110 driven by a screw motor 120 and a pneumatic actuator 130 removes pellets from the SSP reactor discharge 100. These pellets are fed through a pipe 135 by gravity, under an inert gas atmosphere, to a hopper 140 connected with the throat of an extruder 150. The retractile sampler operates at a frequency to insure that the hopper 140 maintains an amount of pellets corresponding to 25% to 75% of its capacity. The pellets are fed into the metering section of the extruder and are melted continuously by the electrically heated 170 extruder 160, and the molten polymer is pumped at a constant feed rate through a capillary 190 using a gear pump 180. The gear pump 180 and the capillary 190 comprise the "viscometer". The viscometer is electrically heated 170 to maintain a constant temperature, and the pressure drop across the capillary is measured by a pressure transducer 195 placed in the polymer melt stream before the inlet to the capillary and in some cases, also after the capillary. In the case where the viscometer bleed is a waste stream the second transducer is normally omitted in the unit construction. The accuracy of the viscometer melt viscosity measurement is improved if the temperature of the molten polymer is also measured in the section of the unit immediately in front of the capillary by a temperature probe 185.

Using the measured pressure drop of the molten polymer across the capillary and knowing the molten polymer temperature, the melt viscosity is calculated using Hagen-Poiseuille equation. The calculation is performed by a general purpose computer or other device that electronically carries out logical operations. If the molten polymer temperature is not measured, the heater temperature, as determined by the heating system 170 in the viscometer must be used as a reference temperature. Empirical equations are developed to convert the melt viscosity to the common solution viscosity values such as IV for polyesters and Relative Viscosity (RV) for polyamides.

In the case of PET the calculated IV is the process variable of a PID controller performed by a general purpose computer or other device that electronically carries out logical operations, the output of this PID-IV controller can adjust the inert gas temperature, inert gas purity or the reactor residence time. The changes are effected respectively by changing the heat input to the inert gas heater system, the degree of gas wash/and purification and by changing throughput or SSP reactor level, to obtain SSP with minimum possible IV variability.

Viscometer

The capillary is internally polished with a diameter between 1.5 to 2.3 millimeters and a length up to 100 millimeters. This L/D ratio ensures that end effects can normally be neglected in computing the inferred melt viscosity from the measured pressure drop. The pressure sensor is a Dynisco (Franklin, Mass. USA) 'smart' pressure transmitter, this type is used principally to avoid any ambient temperature effects on the measured pressure drop value. The polymer pump transfers between 0.5 to 0.8 Kg/h, the pump drive consists of a synchronous motor and gearbox.

Viscosity Calculation

The most important component of the viscometer measurement set up is known as the 'viscometer sensitivity'. The equation used to convert the capillary pressure drop to IV for PET and PET copolymers according to the disclosed methods, containing up to 15 mole % comonomers is the following:

$$IV = K\left(\exp^{\left(\frac{-6800}{T_{abs}}\right)} * \Delta P\right)^{\frac{1}{x}} + bias$$

Where $T_{abs}$ is the absolute temperature of the molten polymer (° K), $\Delta P$ is the pressure drop across the capillary, $1/X = 0.17355 \pm 0.0065$, K is an empirical constant and bias represents the loss in IV caused by polymer degradation in the extruder (approx 0.03±0.01 dl/g). When calibrating the viscometer, the bias value must be as close as possible to the IV drop in the extruder otherwise the sensitivity of the viscometer is affected. The loss of PET intrinsic viscosity (IV) in the extruder can be determined separately by comparing the inlet IV of the chip, and the IV of the extrudate from the extruder before the gear pump, measuring both sets of IV data according to the normal solution measurement.

The PET Intrinsic Viscosity (IV) is measured according to ASTM D4603

Example 1

The IV from the SSP reactor is controlled automatically by adjusting the SSP reactor residence time. The residence time is adjusted by changing the speed of the rotary device which discharges the polymer from the SSP reactor. As the feed rate of crystallized low molecular weight feed does not change, the level of the reactor will gradually change in a sense opposite to the change in speed, due to different inlet and outlet rates. If the outlet speed is increased the inventory of the reactor will fall and vice versa. This control mode may eventually require further attention from the control system or from the operations group, as the level changes permitted in the SSP reactor can only be within predefined upper or lower limits. When such limits are reached additional process changes can be invoked, for example process temperature changes can be made in the gas stream, or the inlet chip feed temperature or feed rate adjustments to the reactor can be used in the case the reactor level is at one of the limits of the automatic control.

If, for example, IV is below target, then the speed of the discharge unit is reduced and level of the reactor goes up. As the SSP reactor residence time increases, the IV target eventually is achieved. Additionally the feed rate device to the SSP reactor (mass flow feeder, screw feeder or rotary valve) can be adjusted. Changing the reactor discharge rate allows more rapid IV control than changing temperature.

A comparison was made of the daily average IV laboratory values (based on the average of triplicate measurements of the pellets, three times a day) of the SSP PET copolyester (Invista Type 1101, containing 2.8 mole % isophthalic acid and 3 mole % diethylene glycol) pellets having a target IV of 0.850 dl/g using a manual method to control IV, with that achieved using the continuous on-line method. The coefficient of variation of the IV was 30% lower (1.06% compared to 1.4%) using the on-line method of control based on a trial in which the SSP process was controlled manually for 120 days and then controlled by the on-line method for a further 120 days.

Example 2

In this example, the IV of the PET SSP pellets was controlled by the purity of the inert gas stream (nitrogen). The ethylene glycol (EG) and water generated by the polycondensation reaction is transferred to the inert gas phase, and the SSP rate depends on the concentration of these subcomponents in the inert gas stream. The composition of EG and water in the inert gas stream achieves steady state by bleeding and purifying a fraction of the inert gas circulation loop flow to the inert gas purification system. The higher the fraction of the inert gas loop sent to the purification system, the lower is the concentration of EG and water in the recycled inert gas and the higher the rate of IV build in the SSP reactor.

Figure 2:
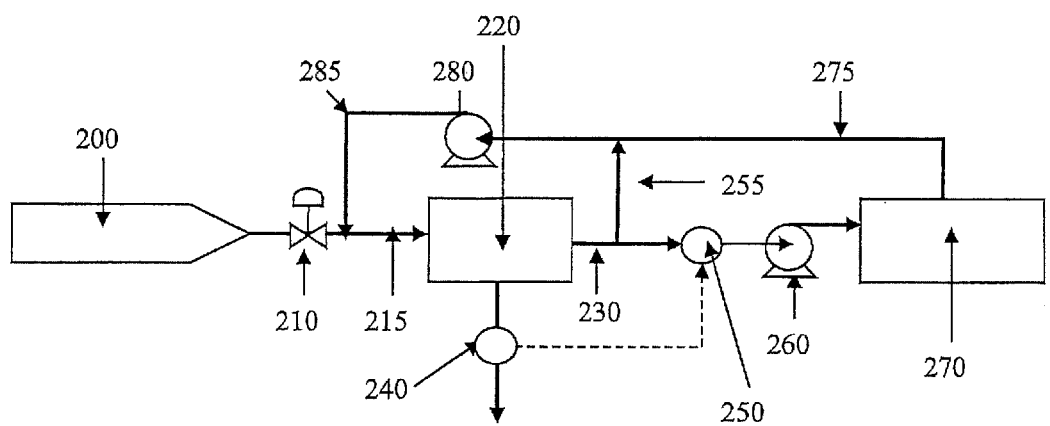
FIG. 2 shows an embodiment in which the viscometer controls the purity of the inert gas stream.

Referring to FIG. 2, the inert gas exits the SSP reactor 220 through a pipe 230. A fraction of the total inert gas flow is pumped 260 through the inert gas purification process 270 and the rest bypasses the purification system through the pipe 255. The fraction that flows into the inert gas purification process 270 is set by a flow element 250. This flow element is controlled by the on-line viscometer 240. The inert gas loop also includes a means to maintain the mass of inert gas flowing through the SSP reactor 220 through pipe 215 using pure inert gas 200, a control valve 210 to combine with the inert gas being pumped 280 from the purification system through pipe 285 after mixing with the inert gas flow which was purified passing through pipe 275 and that inert gas that was not purified, passing through pipe 225.

In this example the degree of control is most improved if the purification system 270 is based on a scrubbing system based on ethylene glycol comprising one or more columns.

The hourly standard deviation (based on 30 measurements of the viscometer pressure drop per hour) of IV around a mean of 0.925 dl/g was 0.00049 (coefficient of variation of less than 0.06%) over a period of six months using the on-line viscometer to control the purity of the inert gas flowing through the SSP reactor while producing polymer suitable for high quality tire yarns. This compares to a hourly coefficient of variation of the viscosity IV of greater than 0.09% when using the viscometer to perform the same pressure drop measurements but using only manual control, showing an improvement caused by the combination of on line control and viscometer measurement of 30% compared to manual control.

Example 3

The SSP IV can be controlled by adjusting chip temperature via the reactor inert gas temperature in the upper stages of SSP reactors with one or more inert gas loops.

Figure 3:
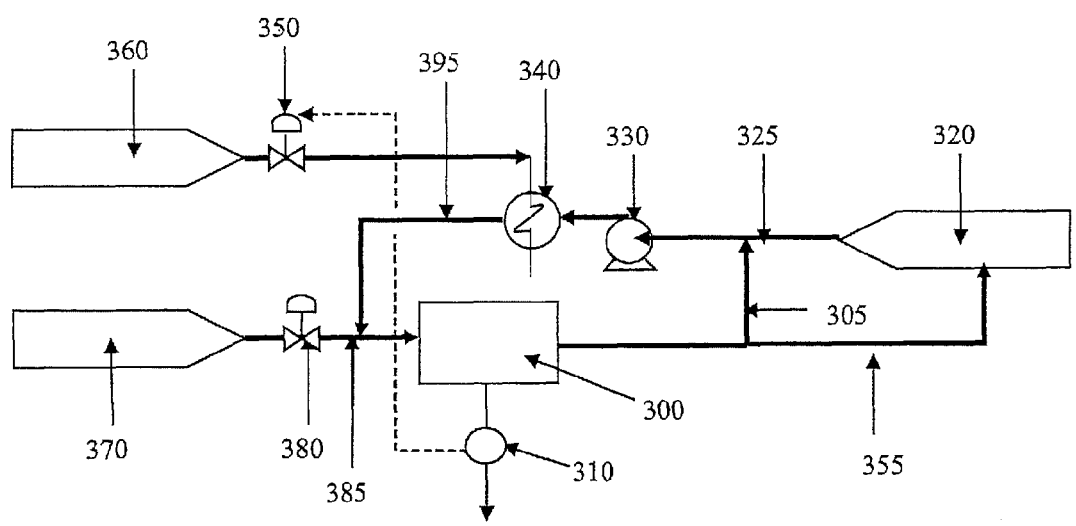
FIG. 3 shows an embodiment in which the viscometer controls the temperature of the inert gas stream.

With reference to FIG. 3, part of the inert gas exiting the SSP reactor 300 through pipe 355 goes to the inert gas purifier 320 and the rest flows through pipe 305 and is combined with the inert gas exiting the inert gas purifier 320 through pipe 325. The inert gas is pumped 330 through a heat exchanger 340 in which the flow of heating fluid 360 is regulated by a valve 350 that is controlled by the viscometer 310. In addition, FIG. 3 shows the addition of the inert gas make up 370 flowing through a valve 380 combining with the heated inert gas flowing through pipe 395 into pipe 385 entering the bottom of the SSP reactor 300.

The reactor volume is fixed while the SSP residence time is determined by throughput. The inert gas stream entering the bottom of the reactor, after passing through an inert gas purification system comprising a catalytic system contains extremely small concentrations of EG and water (less than 150 ppm) such that these gases have very little if any influence on the final IV. The IV control is set by an algorithm where the required inert gas temperature is calculated and adjusted to control IV at constant inlet inert gas composition.

The IV control algorithm used to calculate the residence time, inert gas purity, and inert gas inlet temperature changes for IV adjustment is as follow:

$$\text{Process change} = -K_1 * (IV_{t=o} - IV_{target}) + K_2 * (IV_{t-x} - IV_{target}), \text{ where}$$

$IV_{t=o}$=IV at the current time (may be a time averaged value), and $IV_{target}$=desired IV average, and $IV_{t-x}$=IV average at one time interval (x) previously, and $K_1$ and $K_2$ are constants determined from the open loop control process response.

This calculation is performed at a specified time interval equal to x hours, with x based on several different factors, such as dead time, process response time, residence time etc. The control scheme can be used to automatically adjust a process variable, or prompt a manual parameter change. Alternatively, the control scheme can be set up with a running summation of process changes with a dead band within which no process change is made.

Using the on-line viscometer to control the inert gas temperature improved the hourly IV coefficient of variation from 0.1%, using manual control, to less than 0.06% using on line control, each measured over a 180 day period.

Example 4

The on-line viscometer can also be used to control more than one of the process variables i.e. reactor residence time, inert gas purity and inert gas temperature.

An on-line viscometer as described above in regards to the disclosed methods can also be used in the solid state polymerization of other polycondensation polymers such as poly(trimethylene terephthalate) and its copolyesters comprising at least 85 mole % of terephthalate units, and poly(butylene terephthalate) and its copolyesters comprising at least 85 mole % of terephthalate units. In addition, the SSP of polyamides such as poly(hexamethylene adipamide) and poly(caprolactam) can take advantage of this on-line viscometer control method to reduce the variability of the molecular weight.

While the invention has been described in conjunction with the disclosed methods, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method of controlling the molecular weight of a solid phase polymerized polycondensation polymer, comprising:
   a) generating a melt viscosity output value by measuring the melt viscosity of SSP polymer chips from the exit of a SSP reactor,
   b) controlling the SSP reactor residence time with the melt viscosity output value, and
   c) repeating steps a and b to.

2. The method of claim 1 wherein said polymer is a polyester.

3. The method of claim 2 wherein said polyester is poly(ethylene terephthalate).

4. The method of claim 2 wherein said polyester is a copolyester of poly(ethylene terephthalate) containing up to 15 mole % of a comonomer.

5. The method of claim 1 wherein said polymer is a polyamide.

6. The method of claim 5 wherein said polyamide is selected from poly(hexamethylene adipamide) and poly (caprolactam).

7. A method of controlling the molecular weight of a solid phase polymerized polycondensation polymer, comprising:
   a) generating a melt viscosity output value by measuring the melt viscosity of SSP polymer chips from the exit of a SSP reactor,
   b) controlling the SSP reactor inert gas purity with the melt viscosity output value,
   c) and repeating steps a and b.

8. The method of claim 7 wherein said polymer is a polyester.

9. The method of claim 8 wherein said polyester is poly(ethylene terephthalate).

10. The method of claim 8 wherein said polyester is a copolyester of poly(ethylene terephthalate) containing up to 15 mole % of a comonomer.

11. The method of claim 7 wherein said polymer is a polyamide.

12. The method of claim 11 wherein said polyamide is selected from poly(hexamethylene adipamide) and poly (caprolactam).

13. The method of claim 7 wherein the said inert gas is nitrogen.

14. A method of controlling the molecular weight of a solid phase polymerized polycondensation polymer, comprising:
   a) generating a melt viscosity output value by measuring the melt viscosity of SSP polymer chips from the exit of a SSP reactor,
   b) controlling the SSP reactor inert gas temperature with the melt viscosity output value, and
   c) repeating steps a and b.

15. The method of claim 14 wherein the polymer is a polyester.

16. The method of claim 15 wherein said polyester is poly(ethylene terephthalate).

17. The method of claim 15 wherein said polyester is a copolyester of poly(ethylene terephthalate) containing up to 15 mole % of a comonomer.

18. The method of claim 14 wherein said polymer is a polyamide.

19. The method of claim 18 wherein said polyamide is selected from poly(hexamethylene adipamide) and poly(caprolactam).

20. The method of claim 14 wherein said inert gas is nitrogen.

21. A method of controlling the molecular weight of a solid phase polymerized polycondensation polymer, comprising:
   a) generating a melt viscosity output value by measuring the melt viscosity of SSP polymer chips from the exit of a SSP reactor, and
   b) controlling the at least two SSP reactor values selected from the group consisting of: (i) reactor residence time; (ii) inert gas temperature; and (iii) inert gas purity, with the melt viscosity output value, and
   c) repeating steps a and b.

22. The method of claim 21 wherein said polymer is polyester.

23. The method of claim 22 wherein said polyester is poly(ethylene terephthalate).

24. The method of claim 22 wherein said polyester is a copolyester of poly(ethylene terephthalate) containing up to 15 mole % of a comonomer.

25. The method of claim 21 wherein said polymer is a polyamide.

26. The method of claim 25 wherein said polyamide is selected from poly(hexamethylene adipamide) and poly(caprolactam).

27. The method of claim 21 wherein said inert gas is nitrogen.

28. A method of controlling the molecular weight of a solid phase polymerized PET or PET copolyesters using a SSP viscometer, comprising:
   a) generating a melt viscosity output value by measuring the melt viscosity of SSP PET or PET copolyester polymer chips from the exit of a SSP reactor,
   b) controlling the SSP reactor residence time with the melt viscosity output value, and
   c) repeating steps a and b,
   wherein the PET or PET copolyester has a more than 20% reduction in a coefficient of variation of the average daily solution IV over a 120 day time period compared to the coefficient of variation of the average daily solution IV of the PET or PET copolyester over the same time period, not using the SSP viscometer to control the molecular weight.

29. A method of controlling the molecular weight of a solid phase polymerized PET or PET copolyesters using a SSP viscometer, comprising:
   a) generating a melt viscosity output value by measuring the melt viscosity of SSP PET or PET copolyester polymer chips from the exit of a SSP reactor,
   b) controlling the SSP reactor inert gas purity with the melt viscosity output value, and
   c) repeating steps a and b,
   wherein the PET or PET copolyester has a more than 20% reduction in a coefficient of variation of the average daily solution IV over a 120 day time period compared to the coefficient of variation of the average daily solution IV of the PET or PET copolyester over the same time period, not using the SSP viscometer to control the molecular weight.

30. The method of claim 29 wherein the said inert gas is nitrogen.

31. A method of controlling the molecular weight of a solid phase polymerized PET or PET copolyesters using a SSP viscometer, comprising:
   a) generating a melt viscosity output value by measuring the melt viscosity of SSP PET or PET copolyester polymer chips from the exit of a SSP reactor,
   b) controlling the SSP reactor inert gas temperature with the melt viscosity output value, and
   c) repeating steps a and b,
   wherein the PET or PET copolyester has a more than 20% reduction in a coefficient of variation of the average daily solution IV over a 120 day time period compared to the coefficient of variation of the average daily solution IV of the PET or PET copolyester over the same time period, not using the SSP viscometer to control the molecular weight.

32. The method of claim 31 wherein the said inert gas is nitrogen.

33. A method of controlling the molecular weight of a solid phase polymerized PET or PET copolyesters using a SSP viscometer, comprising:
   a) generating a melt viscosity output value by measuring the melt viscosity of SSP PET or PET copolyester polymer chips from the exit of a SSP reactor,
   b) controlling at least two SSP reactor values selected from the group consisting of: (i) reactor residence time; (ii) inert gas temperature; and (iii) inert gas purity with the melt viscosity output value, and
   c) repeating steps a and b,
   wherein the PET or PET copolyester has a more than 20% reduction in a coefficient of variation of the average daily solution IV over a 120 day time period compared to the coefficient of variation of the average daily solution IV of the PET or PET copolyester over the same time period, not using the SSP viscometer to control the molecular weight.

34. The method of claim 33 wherein the said ineli gas is nitrogen.

35. The method of claim 33, wherein the melt viscosity output value is IVt-x.

36. The method of claim 33, wherein the melt viscosity output value is IVt-0.

37. The method of claim 33, wherein the controlling step is done using an open loop control process.

38. The method of claim 1, wherein controlling the SSP reactor residence time with the melt viscosity output value comprises increasing the SSP reactor residence time when the melt viscosity output value is below a target value, or decreasing the SSP reactor residence time when the melt viscosity output value is above the target value.

39. The method of claim 7, wherein controlling the SSP reactor inert gas purity with the melt viscosity output value comprises increasing the SSP reactor inert gas purity when the melt viscosity output value is below a target value, or decreasing the SSP reactor inert as purity when the melt viscosity output value is above the target value.

40. The method of claim 1, wherein repeating steps a and b maintains an hourly coefficient of variation of the melt viscosity output value of less than 0.06%.

41. The method of claim 7, wherein repeating steps a and b maintains an hourly coefficient of variation of the melt viscosity output value of less than 0.06%.

42. The method of claim 14, wherein repeating steps a and b maintains an hourly coefficient of variation of the melt viscosity output value of less than 0.06%.

43. The method of claim 21, wherein repeating steps a and b maintains an hourly coefficient of variation of the melt viscosity output value of less than 0.06%.

* * * * *